(12) United States Patent
Farrington et al.

(10) Patent No.: US 10,205,664 B2
(45) Date of Patent: Feb. 12, 2019

(54) SYSTEM AND METHOD FOR ROUTING

(71) Applicant: ROCKLEY PHOTONICS LIMITED, London (GB)

(72) Inventors: Nathan Farrington, Arcadia, CA (US); Chiang Yeh, Sierra Madre, CA (US); Bhaskar Chowdhuri, San Diego, CA (US)

(73) Assignee: Rockley Photonics Limited, London (GB)

( * ) Notice: Subject to any disclaimer, the term of this patent is extended or adjusted under 35 U.S.C. 154(b) by 169 days.

(21) Appl. No.: 15/279,267

(22) Filed: Sep. 28, 2016

(65) Prior Publication Data

US 2017/0093717 A1    Mar. 30, 2017

Related U.S. Application Data

(60) Provisional application No. 62/234,451, filed on Sep. 29, 2015.

(51) Int. Cl.
| | |
|---|---|
| *H04L 12/741* | (2013.01) |
| *H04L 12/751* | (2013.01) |
| *H04L 12/721* | (2013.01) |
| H04L 12/723 | (2013.01) |
| H04L 12/863 | (2013.01) |
| H04L 12/935 | (2013.01) |

(52) U.S. Cl.
CPC ............ *H04L 45/745* (2013.01); *H04L 45/08* (2013.01); *H04L 45/34* (2013.01); *H04L 45/50* (2013.01); *H04L 47/628* (2013.01); *H04L 49/3009* (2013.01)

(58) Field of Classification Search
CPC ....... H04L 45/745; H04L 45/08; H04L 45/34; H04L 45/50

USPC .................................... 370/329, 392
See application file for complete search history.

(56) References Cited

U.S. PATENT DOCUMENTS

| | | | |
|---|---|---|---|
| 8,493,976 B2 | 7/2013 | Lin | |
| 8,774,625 B2 | 7/2014 | Binkert et al. | |
| 8,942,559 B2 | 1/2015 | Binkert et al. | |
| 2003/0231625 A1* | 12/2003 | Calvignac ............. | H04L 49/602 370/389 |

(Continued)

FOREIGN PATENT DOCUMENTS

WO    WO 2015/060820 A1    4/2015

OTHER PUBLICATIONS

Afek, Yehuda et al., "Trainet: A new label switching scheme", IEEE INFOCOM, 2000, pp. 874-883.

(Continued)

*Primary Examiner* — Ricky Q Ngo
*Assistant Examiner* — Ellen A Kirillova
(74) *Attorney, Agent, or Firm* — Lewis Roca Rothgerber Christie LLP

(57) ABSTRACT

A system and method for routing. A packet includes a stack of one or more headers, such as a stack of Multiprotocol Label Switching headers, that determines the path that the packet will take, through a sequence of switches, from its source to its destination. Each header in the stack contains an output port identifier that identifies an output port of a corresponding switch in the path. Each switch, upon receiving the packet, removes the first header to form a shortened packet, and routes the shortened packet to the output port identified by the output port identifier.

10 Claims, 7 Drawing Sheets

(56) References Cited

U.S. PATENT DOCUMENTS

| | | | |
|---|---|---|---|
| 2005/0008010 A1* | 1/2005 | Reed | H04L 12/56 370/360 |
| 2006/0251074 A1* | 11/2006 | Solomon | H04L 45/04 370/392 |
| 2007/0286204 A1* | 12/2007 | Ould-Brahim | H04L 12/4633 370/395.5 |
| 2012/0033620 A1* | 2/2012 | Thoen | H04J 3/0697 370/329 |
| 2013/0235887 A1* | 9/2013 | Mamidwar | H04L 41/0816 370/503 |
| 2014/0177638 A1 | 6/2014 | Bragg et al. | |
| 2015/0110113 A1* | 4/2015 | Levy | H04L 45/745 370/392 |

OTHER PUBLICATIONS

Ashwood-Smith et al., "SDN state reduction", Internet Engineering Task Force, Internet Draft, Jul. 2013, pp. 2-23.

International Search Report and Written Opinion of the International Searching Authority, dated Feb. 9, 2017, Corresponding to PCT/IB2016/001506, 13 pages.

Fang, Luyuan et al., "Hierarchical SDN for the Hyper-Scale, Hyper-Elastic Data Center and Cloud", ACM, SOSR2015, Jun. 17-18, 2015, 13 pages, Santa Clara, CA, USA.

Filsfils, C. et al., "Segment Routing with MPLS data plane", Network Working Group, Internet—Draft, May 29, 2015, (expired Nov. 30, 2015), pp. 1-14.

Filsfils, C. et al., "Segment Routing with MPLS data plane", Network Working Group, Internet—Draft, Jul. 6, 2016, (expired Jan. 7, 2017), pp. 1-15.

Jin, Xin et al., "Your Data Center Switch is Trying Too Hard", ACM, 2016, 6 pages.

Jyothi, Sangeetha Abdu et al., "Towards a Flexible Data Center Fabric with Source Routing", ACM, SOSR2015, Jun. 17-18, 2015, 8 pages, Santa Clara, CA, USA.

Mysore, Radhika Niranjan et al., "PortLand: A Scalable Fault-Tolerant Layer 2 Data Center Network Fabric", ACM, SIGCOMM'09, Aug. 17-21, 2009, 12 pages, Barcelona, Spain.

Previdi, S. et al., "SPRING Problem Statement and Requirements", Network Working Group, Internet—Draft, Apr. 27, 2015, (expired Oct. 29, 2015), pp. 1-16.

Previdi, S. et al., "Source Packet Routing in Networking (SPRING) Problem Statement and Requirements", Internet Engineering Task Force (IETF), May 25, 2016, pp. 1-19.

Ramos, Ramon Marques et al., "SlickFlow: Resilient Source Routing in Data Center Networks Unlocked by OpenFlow", IEEE Conference on Local Computer Networks, Oct. 2013, 8 pages.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                Label                  | Exp |S|      TTL      |
+-+-+-+-+-+-+-+-+-+-+-+-+-+-+-+-+-+-+-+-+-+-+-+-+-+-+-+-+-+-+-+-+

Label:  Label Value, 20 bits
    Exp:    Experimental Use, 3 bits
    S:      Bottom of Stack, 1 bit
    TTL:    Time to Live, 8 bits
```

*FIG. 2*

SYSTEM AND METHOD FOR ROUTING

CROSS-REFERENCE TO RELATED APPLICATION(S)

The present application claims priority to and the benefit of U.S. Provisional Application No. 62/234,451, filed Sep. 29, 2015, entitled "ROUTING METHODOLOGY", the entire content of which is incorporated herein by reference.

FIELD

One or more aspects of embodiments according to the present invention relate to routing, and more particularly to a system and method for source routing.

BACKGROUND

Various applications, including the delivery of Internet data, involve the routing of packets from a source to a destination, via one or more intermediate nodes such as switches or routers. In some related art systems each switch in a network may maintain information, or "state information" about the topology of the network, and make routing decisions, e.g., based on a destination address in a packet and the state information it maintains. It may then send the packet to another switch, for example, based on the routing decision. Such a process may be cumbersome because it involves storing and maintaining state information and may involve relatively complex algorithms for making routing decisions. These factors may lead to an increase in the cost of the switch, or a reduction in its performance.

Thus, there is a need for an improved system and method for routing.

SUMMARY

Aspects of embodiments of the present disclosure are directed toward a system and method for routing. A packet includes a stack of one or more headers, such as a stack of Multiprotocol Label Switching headers. Each header in the stack contains a field that encodes the output port of a given switch along the path that the packet will take from its source to its destination. Each switch removes (pops) the current top header in the stack, thus shortening the packet that it retransmits to the next switch along the path. The operations of popping the current top header and extracting the switch's output port number from the header's field are done without requiring the switch to maintain any programmable state.

According to an embodiment of the present invention there is provided a system for processing input data packets, the system having a plurality of output ports and including: a state machine including: a state register; and combinational logic, the state machine being configured to: receive an input data packet; and remove from the input data packet a header containing an output port identifier identifying an output port of the plurality of output ports, to form a shortened packet; the system being configured to output the shortened packet through the identified output port.

In one embodiment, the system includes an input first-in, first-out structure (input FIFO), the state machine being configured to receive the input data packet from the input FIFO.

In one embodiment, the system includes an output first-in, first-out structure (output FIFO), the state machine being configured to feed the shortened packet to the output FIFO.

In one embodiment, the system includes a first Ethernet header and one or more Multiprotocol Label Switching (MPLS) headers, and the header is the first MPLS header of the one or more MPLS headers.

In one embodiment, the state machine is further configured to: remove from an input Ethernet data packet an MPLS header, to form a shortened packet; and feed the shortened packet to the output FIFO, when an Ethertype field of the Ethernet header has a value of hexadecimal 8847; and feed the input Ethernet data packet to the output FIFO, when an Ethertype field of the Ethernet header does not have a value of hexadecimal 8847.

In one embodiment, the state machine is configured to receive the input packet from the input FIFO one input data word at a time.

In one embodiment, the length of each input data word is 256 bits.

In one embodiment, the state machine is configured to feed to the output FIFO a sequence of output data words, each of the output data words consisting of a part of a first input data word received from the input FIFO and a part of a second input word received from the input FIFO after the first input data word.

In one embodiment, the system includes a demultiplexer to convert, at the input of the system, a first data stream carrying the input Ethernet data packets, to a second data stream, having a greater width and a lower clock speed than the first data stream, the system being configured to feed the second data stream to the input FIFO.

In one embodiment, the input FIFO is an asynchronous FIFO.

In one embodiment, the state machine is configured, when the first MPLS header of the Ethernet packet is not the only MPLS header of the Ethernet packet, upon receiving a final input data word of the packet containing the end of a data packet, to combine the final input data word with a part of the previous input data word to form an output data word, when the length of valid data in the final input data word is not greater than the length of the first MPLS header, and combine a part of the final input data word with a part of the previous input data word to form an output data word; and form a final output data word from the remainder of the final input data word, when the length of valid data in the final input data word is less than the length of the first MPLS header.

In one embodiment, the outputting of the shortened packet through the identified output port includes extracting the output port identifier from a portion of the first MPLS header.

In one embodiment, the portion of the first MPLS header is the MPLS label portion of the first MPLS header.

In one embodiment, the state machine is further configured to remove from the input Ethernet data packet a codeword, when the Ethertype field of the Ethernet header has a value of hexadecimal 8847 and the first MPLS header is the only MPLS header of the Ethernet packet.

According to an embodiment of the present invention there is provided a system for processing data packets, the system being configured to be connected, in a network, with one or more other sources and/or recipients of data packets, the system including: an input port for receiving input data packets; a plurality of output ports for sending data packets; and a processing circuit, configured to: receive an input data packet, the input data packet including a header containing an output port identifier identifying an output port of the plurality of output ports; remove the header from the input data packet to form a shortened packet; and output the shortened packet through the identified output port, the system being configured to process the data packets without storing, in the system, information about connections between the one or more other sources and/or recipients of data packets.

In one embodiment, the processing circuit includes a state machine configured to: receive an input data packet; and remove the header from the input data packet to form the shortened packet.

In one embodiment, the system includes a first Ethernet header and one or more Multiprotocol Label Switching (MPLS) headers, and the header is the first MPLS header of the one or more MPLS headers.

In one embodiment, the outputting of the shortened packet through the identified output port includes extracting the output port identifier from a portion of the first MPLS header.

BRIEF DESCRIPTION OF THE DRAWINGS

These and other features and advantages of the present invention will be appreciated and understood with reference to the specification, claims, and appended drawings wherein:

FIG. 2 is a diagram of the composition of a Multiprotocol Label Switching (MPLS) header, according to an embodiment of the present invention;

DETAILED DESCRIPTION

The detailed description set forth below in connection with the appended drawings is intended as a description of exemplary embodiments of a system and method for routing provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

In a routing system employing source routing, a data packet (e.g., an Ethernet frame) may be generated by a source of data packets, for transmission along a path through a plurality of switches, for eventual delivery to a destination. In some embodiments, the source determines the route the packet is to take through the switches, and specifies it, e.g., as a sequence or "stack" of headers, each including an identifier (or "output port identifier"), each identifier identifying an output port of the current switch.

For example, each switch in a network may have a plurality of numbered ports, each connected to a source and/or recipient of data packets in the network, such as other switches or servers. The switch may have one or more input ports and a plurality of output ports, each directly connected (i.e., connected by one hop) to one recipient (e.g., another switch or a server). In such a system, each of the identifiers may be an output port number to which the packet is to be directed (or it may correspond to an output port number, e.g., the output port number may be obtained from the output port identifier by an operation, such as adding an offset). Each switch may, upon receiving a packet, determine from the first identifier in the stack which output port the packet is to be sent to, and it may delete the first header from the stack (e.g., "pop" the first header from the stack of headers), and send the resulting shortened packet to the specified port. This process may be repeated by each switch, and it may simplify the design of the switch compared to systems in which a switch may need to make routing decision.

Figure 1:
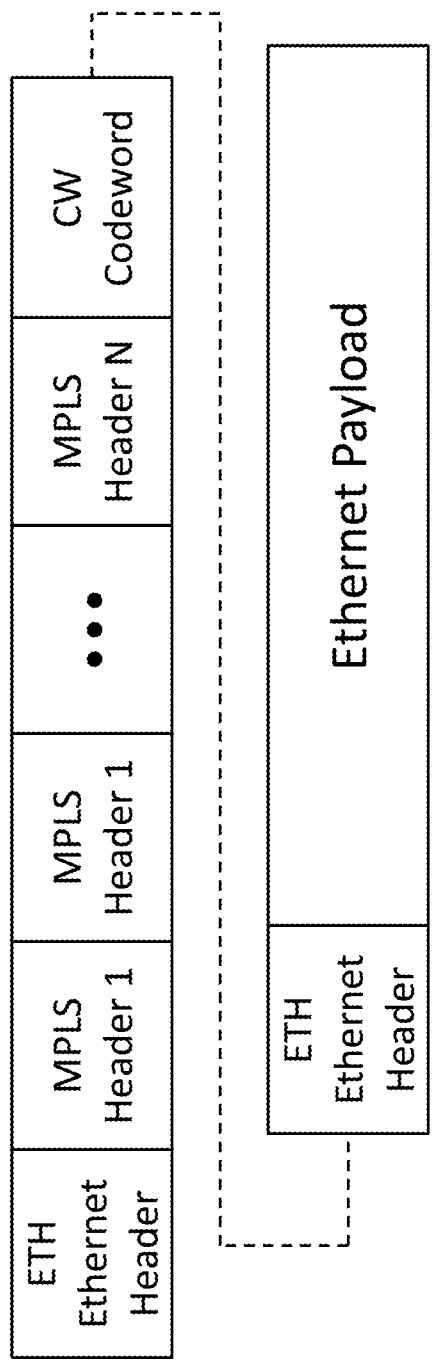
FIG. 1 is a packet composition diagram, according to an embodiment of the present invention.

In one embodiment, Multiprotocol Label Switching (MPLS) is used to perform routing in the above-described manner. Referring to FIG. 1, an Ethernet frame according to one embodiment includes a first Ethernet header, a stack of one or more MPLS headers, a codeword, a second Ethernet header, and an Ethernet payload. In FIG. 1, the order in which the fields of the packet are transmitted may be from left to right, with the first Ethernet header being sent first. The first Ethernet header contains a 6-byte destination media access control (MAC) address, followed by a 6-byte source MAC address, followed by a two-byte Ethertype field. For an Ethernet packet that includes an MPLS stack, the presence of the MPLS stack may be indicated by the Ethertype having a value of hexadecimal 8847 (which may also be written as 0x8847).

Each MPLS header may be a 32-bit wide field with the structure shown in FIG. 2. The eight least significant bits may be a time-to-live (TTL) field, the next bit may be a Bottom-of-Stack bit or "S bit", set to 1 for the last MPLS header in the stack, the next three bits may be bits for experimental use, and the remaining 20 bits may be an MPLS label. In FIG. 2, the order in which the bits are transmitted may be from right to left, with the TTL field being transmitted first. As described above, when an Ethernet packet is received by a switch with a plurality of output ports (as many as $2^{20}$, or approximately 1 million, output ports) the switch may pop the first MPLS header out of the packet and extract the MPLS label from it, and send the shortened packet to the output port identified in the extracted MPLS label.

As such, the switch need not have information about the current network topology (e.g., information about connections between other sources and/or recipients of data in the network) nor make routing decisions. Such information about the current network topology (which may change over time) may be referred to as "state" information, and a switch that does not store such information (e.g., in tables used for routing) may be referred to as a "stateless" switch. A switch that does include such information, e.g., in the form of a forwarding table, a content addressable memory (CAM) table, or routing information base (RIB), may be referred to as a "stateful" switch.

Figure 3A:
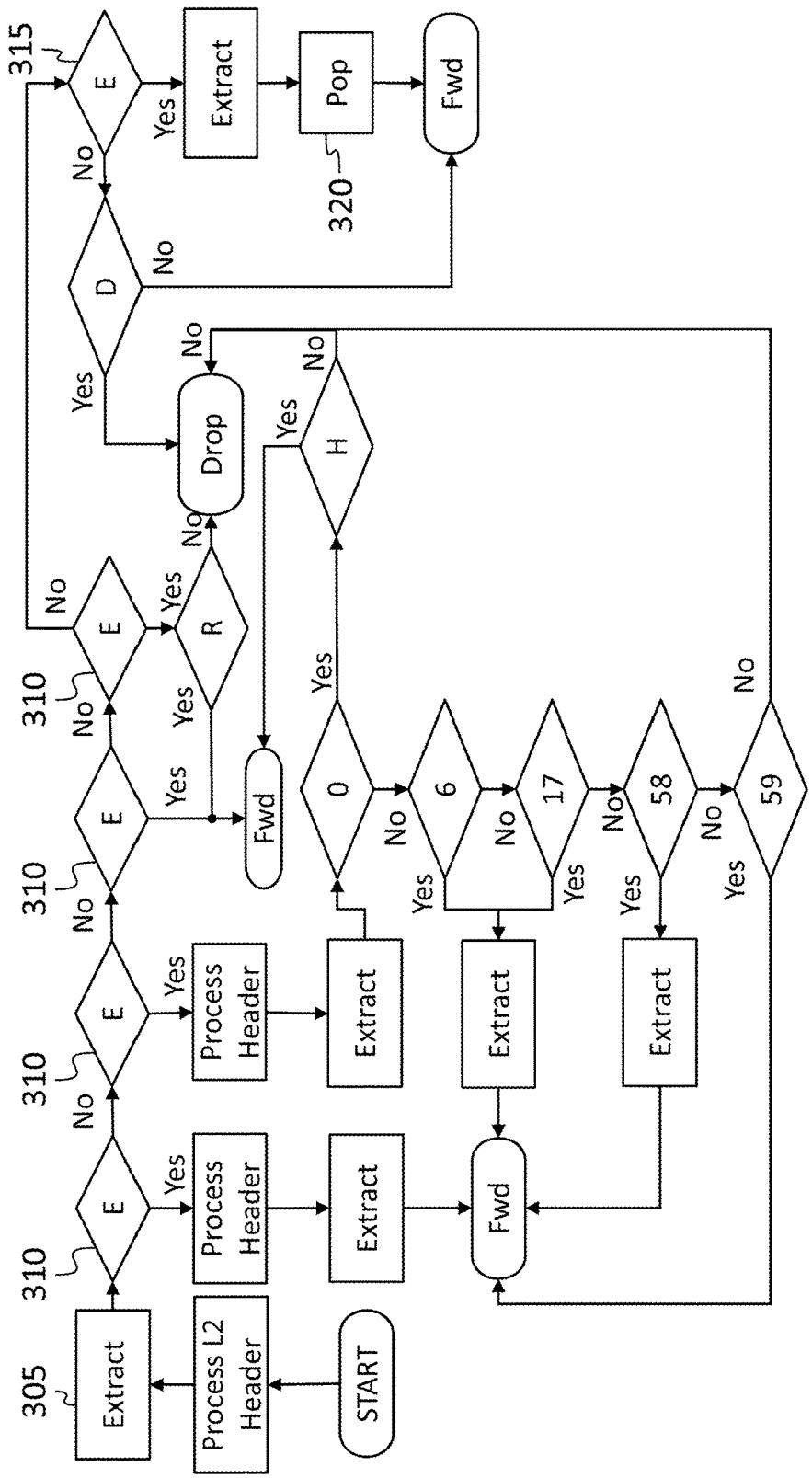
FIG. 3A is a flowchart of a method for processing an Ethernet packet, according to an embodiment of the present invention.
Figure 3B:
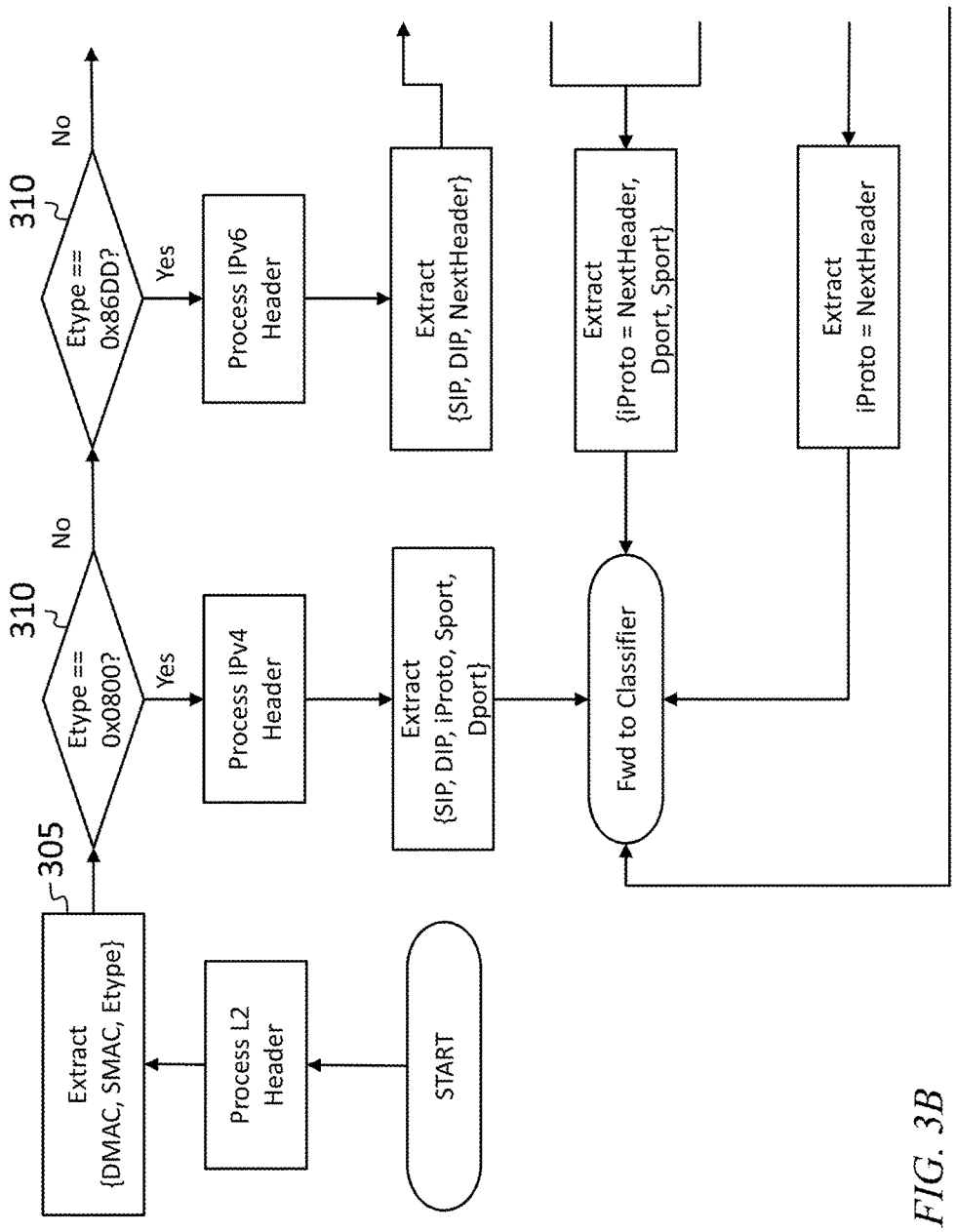
FIG. 3B is an enlarged view with additional labelling, of a portion of the flowchart of FIG. 3A, according to an embodiment of the present invention.
Figure 3C:
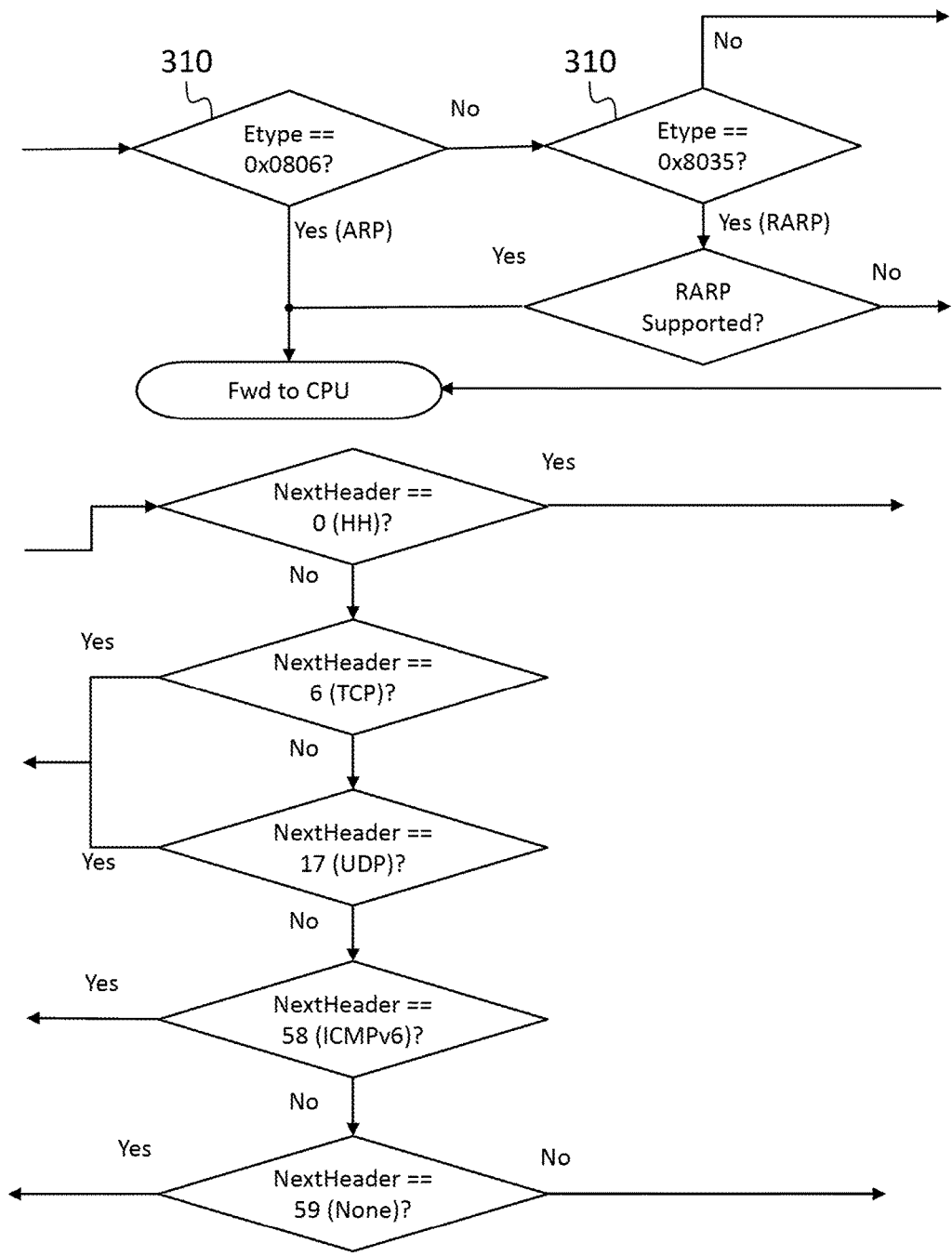
FIG. 3C is an enlarged view with additional labelling, of a portion of the flowchart of FIG. 3A, according to an embodiment of the present invention.
Figure 3D:
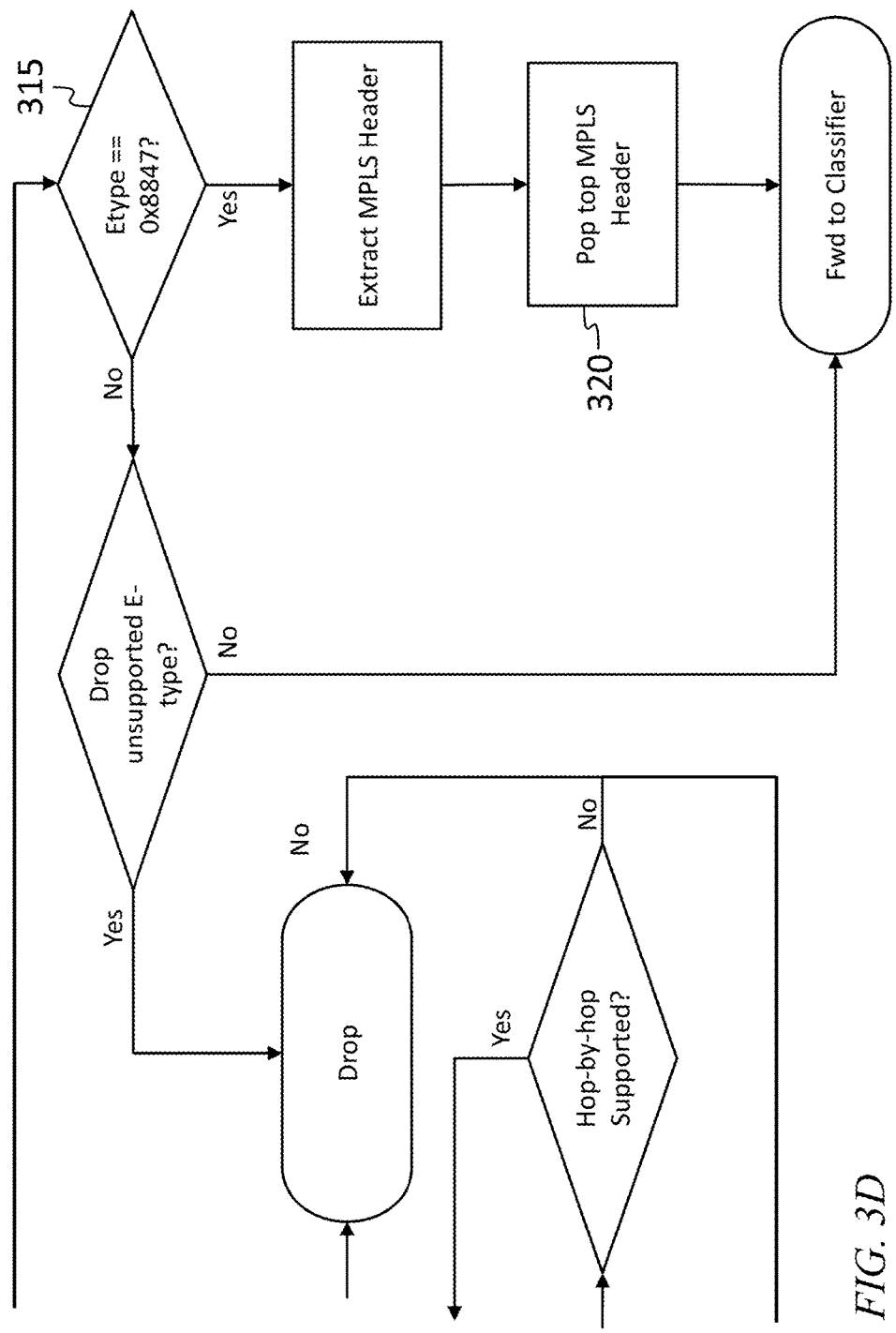
FIG. 3D is an enlarged view with additional labelling, of a portion of the flowchart of FIG. 3A, according to an embodiment of the present invention.

FIGS. 3A-3D show a flowchart of a method for processing an Ethernet packet. FIGS. 3B-3D are provided for clarity and contain enlarged views (with additional text, and with the positions of some connectors adjusted) of the left, middle, and right portions, respectively, of FIG. 3A. For a packet including an MPLS stack, the process may involve extracting, in a step 305, the destination MAC address, the source MAC address, and the Ethertype, and proceeding through a plurality of Ethertype comparison steps 310 that test for Ethertype values other than hexadecimal 8847, to an Ethertype comparison step 315 that tests for the Ethertype value of hexadecimal 8847. The top MPLS header may then be popped, in a step 320, and the shortened packet (with the MPLS header that was formerly at the top having been removed) may be forwarded, e.g., to a classifier, or to an output port specified by the content of the popped MPLS header.

Figure 4:
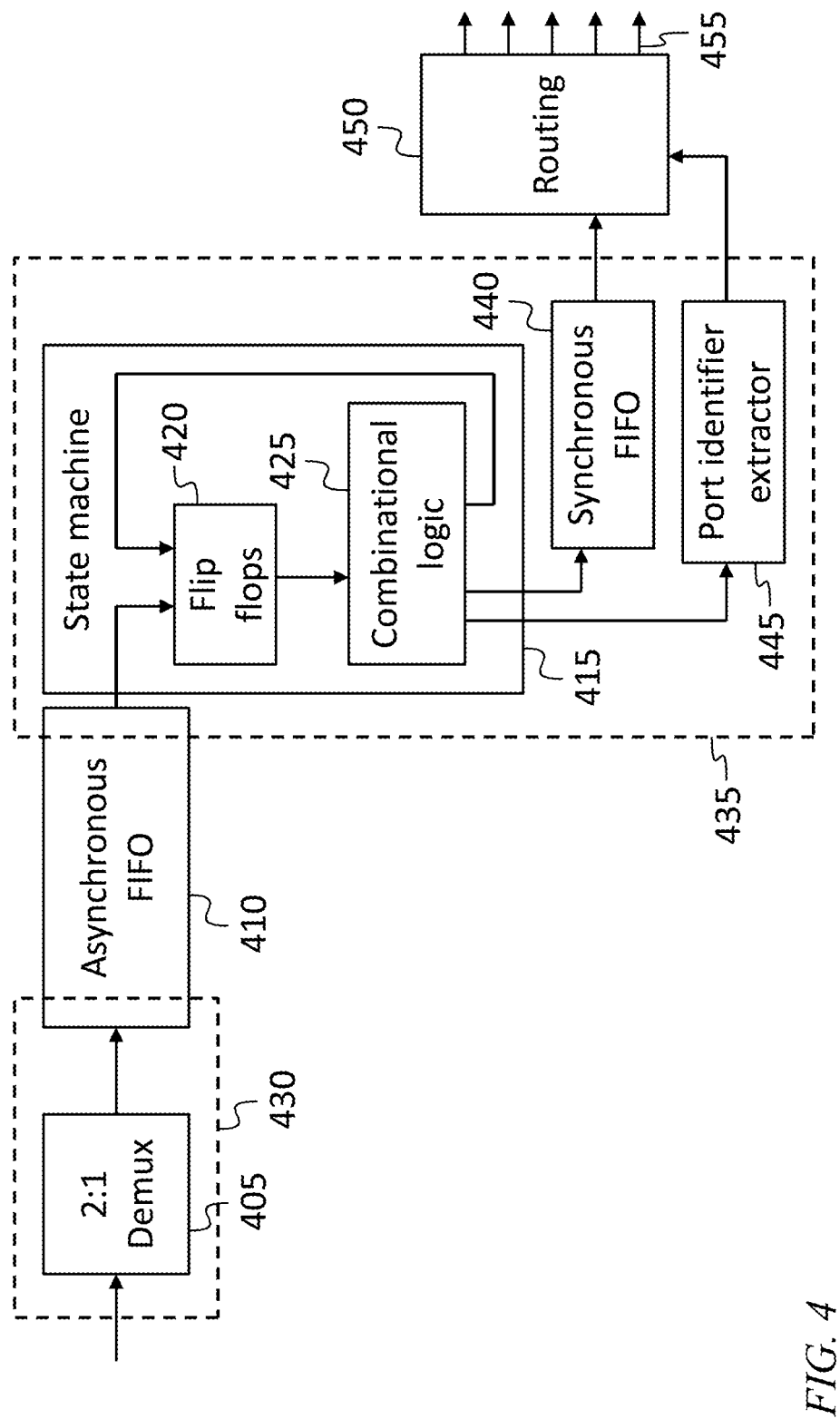
FIG. 4 is a block diagram of a system for routing, according to an embodiment of the present invention.

Listing 1 below shows an implementation, in Verilog code, of a system, referred to herein as a "packet parser", for processing packets according to one embodiment. In operation, the packet parser receives a stream of bits from a media access controller, the bits corresponding to a stream of data packets received by the media access controller. The packet parser also receives, from the media access controller, a byte enable signal, a frame status signal, a start-of-frame (SOF) signal and an end-of-frame (EOF) signal. The byte enable signal (denoted by "_be" in the code) may be valid at the end of a frame, and at that time it may indicate how many valid bytes are included in the current data word received from the media access controller. The frame status signal (denoted by "_frame_status" in the code) may also be valid at the end of a frame, and may indicate whether errors were encountered during the reception of the packet by the media access controller. A block diagram showing the principal elements of the packet parser is shown in FIG. 4.

The bit stream from the media access controller may be received by the packet parser at a relatively high rate, e.g., 900 MHz on a 128-bit wide data bus. Processing data at this rate may approach the limits of the capabilities of the hardware of the packet parser; accordingly, any part of the design operating at the corresponding clock rate (e.g., at 900 MHz) may have relatively small timing margins, and design choices may be constrained by timing requirements. To relax the timing requirements, the packet parser may include a demultiplexer 405 (e.g., a 2:1 demultiplexer, implemented in lines 20-112 of Listing 1), the output of which is twice as wide as, and updates at half the update rate of, the input. The output of the demultiplexer 405 may be connected, through an asynchronous first-in, first-out structure (FIFO) 410 (incorporated in lines 115-134), to a state machine 415 consisting of a plurality of flip flops 420 (forming the state register of the state machine 415) and combinational logic 425. The demultiplexer 405 may operate in a first clock domain 430 (e.g., with a clock frequency of 900 MHz) and the state machine may operate in a second clock domain 435 (e.g., with a clock frequency of 450 MHz); the asynchronous FIFO 410 may perform transmission of data from the first clock domain 430 to the second clock domain 435. The output of the asynchronous FIFO 410 may be a sequence of data words (referred to herein as "input data words") each having a width of 256 bits (32 bytes). The output of the state machine 415 may feed (i) a synchronous FIFO 440, and (ii) a port identifier extractor 445. The synchronous FIFO 440 may be configured to receive data words (referred to herein as "output data words") having the same width (e.g., 256 bits or 32 bytes) as the input data words produced by the asynchronous FIFO 410. The asynchronous FIFO 410 and the synchronous FIFO 440 act as input FIFO and output FIFO, respectively, and are referred to in the code of Listing 1 as the MPPR FIFO and the RX FIFO, respectively (or as mppr_fifo and the rx_fifo). The synchronous FIFO 440 is incorporated at lines 367-392.

The flip flops 420 of the state machine are implemented at lines 137-159 of Listing 1, and the combinational logic 425 of the state machine is implemented at lines 161-361 of Listing 1. The state machine receives, from the asynchronous FIFO 410, input data words, named mppr_fifo_out_frame_data, within which the bits are in the order in which they were received by the media access controller, with the least significant bit being the earliest-received bit.

Referring to lines 183-217 of Listing 1, when the state machine is in a state labelled MPPR_WAIT4SOF, if the Ethertype field of the packet is hexadecimal 8847 (the value indicating an MPLS unicast packet) then, depending on whether the S bit is set, the state machine extracts, into the variable prev_28 bytes_next, either (at line 194, if the S bit is set) the 28 bytes excluding the top MPLS header, or (at line 199, if the S bit is not set) the 24 bytes excluding the last remaining MPLS header and the codeword. In the latter case, the 24 extracted bits are padded (in line 194) with 4 bytes of zeros. The bits removed from the current input data word (i.e., the first MPLS header if the S bit is not set, or the first (and only) MPLS header and the codeword if the S bit is set) may be referred to as the "current stack element".

The codeword may be used to enable an MPLS-compliant switch (e.g., a label edge router (LER)) to operate according to embodiments of the present invention. Such a switch may be programmed to recognize a codeword having a unique value that indicates that a packet is to be routed according to embodiments of the present invention and to process the MLPS headers and codeword, and the subsequent Ethernet header and payload, accordingly.

If the Ethertype field of the packet is not hexadecimal 8847 the state machine pushes the current 32 bytes into the synchronous FIFO 440 (by setting rx_fifo_push to 1; the output of the asynchronous FIFO 410 is fed to the input of the synchronous FIFO 440 by default per line 168). The synchronous FIFO 440 pushes a 32 byte output data word of frame data at a time; accordingly, the variable prev_28 bytes_next is used to store 28 or 24 bytes until the additional 4 or 8 bytes, that will bring the total to the 32 bytes expected by the synchronous FIFO 440, are received in the subsequent 256-bit word from the asynchronous FIFO 410.

Short frames or "runt" frames are discarded. Such frames are detected, for example, at lines 189, 208, and 225 and discarded as a result of rx_fifo_push being left at its default value of 0 when a runt frame is detected. The variable runt_frame is set in Listing 1 and not used, in the code of Listing 1. This variable may be used by software that may read a corresponding register and accumulate statistics on runt frames.

When the received Ethernet packet is an MPLS packet (i.e., its Ethertype is hexadecimal 8847), the state machine progresses from MPPR_WAIT4SOF (the state in which the current stack element is popped and the remaining 28 or 24 bytes are set aside), to the state MPPR_STAGE0, within which one 32-byte word (consisting in part of the 28 or 24 bytes) is pushed into the synchronous FIFO 440, to the state MPPR_WAIT4EOF within which additional 32-byte words are pushed into the synchronous FIFO 440, and then to the state MPPR_FLUSH, if there are overflowing bytes at the end of the frame, to push the overflowing bytes into the synchronous FIFO 440. In the states MPPR_STAGE0 and MPPR_WAIT4EOF the 4-byte or 8-byte offset (resulting from the popping of 4 or 8 bytes from the packet) between the 32 byte words received from the asynchronous FIFO 410 and those fed to the synchronous FIFO 440 is adjusted for.

Each 32 byte output word to be fed to the synchronous FIFO 440 is formed (on lines 239, 244, 289, and 295) by combining 24 or 28 bytes, from one 32 byte input word, with 8 or 4 bytes from the subsequent 32 byte input word. The remainder of the bytes from the subsequent 32 byte input word are then set aside (on lines 240, 245, 290, and 296) for one cycle, and used to form the next 32 byte output word.

In the state MPPR_WAIT4EOF a test of whether the current input word contains the end of the frame is also performed (at line 308). If it has, a determination is made (at line 312 or 326) whether the number of valid bytes in the current input word exceeds the offset (i.e., whether the length of the valid data in the current input data word exceeds the length of the current stack element), and if it does, the state machine transitions to the state MPPR_FLUSH before, in the following cycle, returning to the initial state, MPPR_WAIT4SOF, to wait for the next packet. In the state MPPR_FLUSH, the bytes that did not fit into the last output word are padded by zeros if there are fewer than 32, formed into a final output word, and fed to the synchronous FIFO 440.

In each of the states except MPPR_FLUSH, a test is done (on lines 185, 219, 232, and 305) to determine whether the asynchronous FIFO 410 is empty. If (and while) it is, the state machine refrains (by leaving rx_fifo_push at its default value of 0) from pushing data into the synchronous FIFO 440.

The MPLS label may be (or may include, e.g., as a subset of the bits of the MPLS label) the output port number. In some embodiments the MPLS label space may be partitioned, with a subspace (e.g., a subspace defined by a certain bit or set of bits of the MPLS label having a specified value) being allocated to source routing according to embodiments of the present invention. The port identifier extractor 445 may extract the output port identifier (which may be, or may correspond to, an output port number) from the MPLS label, and the routing block 450 may direct the output of the synchronous FIFO 440 to the appropriate one of a plurality of output ports 455.

A switch, or a portion of a switch, such as the portion illustrated in FIG. 4, may be implemented as a processing circuit. The term "processing circuit" as used herein is any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

Although exemplary embodiments of a system and method for routing have been specifically described and illustrated herein, many modifications and variations will be apparent to those skilled in the art. Accordingly, it is to be understood that a system and method for routing constructed according to principles of this invention may be embodied other than as specifically described herein. The invention is also defined in the following claims, and equivalents thereof.

What is claimed is:

1. A system for processing input data packets, the system having a plurality of output ports and comprising:
   a state machine comprising:
      a state register; and
      combinational logic,
   the state machine being configured to:
      receive an input data packet; and
      remove from the input data packet a header containing an output port identifier identifying an output port of the plurality of output ports, to form a shortened packet;
   the system being configured to output the shortened packet through the identified output port,
   the system further comprising an input first-in, first-out structure (input FIFO), the state machine being configured to receive the input data packet from the input FIFO,
   the system further comprising an output first-in, first-out structure (output FIFO), the state machine being configured to feed the shortened packet to the output FIFO,
   wherein the state machine is configured to process input Ethernet data packets, each input Ethernet data packet including an Ethernet header and one or more Multi-protocol Label Switching (MPLS) headers, and wherein the header is the first MPLS header of the one or more MPLS headers,
   wherein the state machine is further configured to:
      remove from an input Ethernet data packet an MPLS header, to form a shortened packet; and
      feed the shortened packet to the output FIFO, when an Ethertype field of the Ethernet header has a value of hexadecimal 8847; and
      feed the input Ethernet data packet to the output FIFO, when an Ethertype field of the Ethernet header does not have a value of hexadecimal 8847.

2. The system of claim 1, wherein the state machine is configured to receive the input Ethernet data packet from the input FIFO one input data word at a time.

3. The system of claim 2, wherein the length of each input data word is 256 bits.

4. The system of claim 2, wherein the state machine is configured to feed to the output FIFO a sequence of output data words, each of the output data words consisting of a part of a first input data word received from the input FIFO and a part of a second input word received from the input FIFO after the first input data word.

5. The system of claim 4, further comprising a demultiplexer to convert, at the input of the system, a first data stream carrying the input Ethernet data packets, to a second data stream, having a greater width and a lower clock speed than the first data stream,
   the system being configured to feed the second data stream to the input FIFO.

6. The system of claim 5, wherein the input FIFO is an asynchronous FIFO.

7. A system for processing input data packets, the system having a plurality of output ports and comprising:
   a state machine comprising:
      a state register; and
      combinational logic, the state machine being configured to:
  receive an input data packet; and
  remove from the input data packet a header containing an output port identifier identifying an output port of the plurality of output ports, to form a shortened packet;
the system being configured to output the shortened packet through the identified output port,
the system further comprising an input first-in, first-out structure (input FIFO), the state machine being configured to receive the input data packet from the input FIFO,
the system further comprising an output first-in, first-out structure (output FIFO), the state machine being configured to feed the shortened packet to the output FIFO,
wherein the state machine is configured to process input Ethernet data packets, each input Ethernet data packet including an Ethernet header and one or more Multiprotocol Label Switching (MPLS) headers, and wherein the header is the first MPLS header of the one or more MPLS headers,
wherein the state machine is configured to receive the input Ethernet data packet from the input FIFO one input data word at a time,
wherein the state machine is configured to feed to the output FIFO a sequence of output data words, each of the output data words consisting of a part of a first input data word received from the input FIFO and a part of a second input word received from the input FIFO after the first input data word,
the system further comprising a demultiplexer to convert, at the input of the system, a first data stream carrying the input Ethernet data packets, to a second data stream, having a greater width and a lower clock speed than the first data stream,
the system being configured to feed the second data stream to the input FIFO,
wherein the state machine is configured, when the first MPLS header of the Ethernet packet is not the only MPLS header of the Ethernet packet, upon receiving a final input data word of the packet containing the end of a data packet, to
  combine the final input data word with a part of the previous input data word to form an output data word,
    when the length of valid data in the final input data word is not greater than the length of the first MPLS header, and
  combine a part of the final input data word with a part of the previous input data word to form an output data word; and
  form a final output data word from the remainder of the final input data word,
    when the length of valid data in the final input data word is less than the length of the first MPLS header.

8. The system of claim 1, wherein the outputting of the shortened packet through the identified output port comprises extracting the output port identifier from a portion of the first MPLS header.

9. The system of claim 8, wherein the portion of the first MPLS header is the MPLS label portion of the first MPLS header.

10. The system of claim 1, wherein the state machine is further configured to
  remove from the input Ethernet data packet a codeword, when the Ethertype field of the Ethernet header has a value of hexadecimal 8847 and the first MPLS header is the only MPLS header of the Ethernet packet.

* * * * *